US012508818B2

(12) United States Patent
Donato et al.

(10) Patent No.: US 12,508,818 B2
(45) Date of Patent: Dec. 30, 2025

(54) MITIGATION OF INDUCTIVE DISCHARGE TRANSIENTS IN PRINTHEADS

(71) Applicant: ZEBRA TECHNOLOGIES CORPORATION, Lincolnshire, IL (US)

(72) Inventors: Daniel F. Donato, Johnsburg, IL (US); Dwight D. Dipert, Barrington, IL (US); Kenneth V. Naegele, Vernon Hills, IL (US); Ashok K. Charles, Lombard, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 170 days.

(21) Appl. No.: 18/381,131

(22) Filed: Oct. 17, 2023

(65) Prior Publication Data

US 2025/0121610 A1 Apr. 17, 2025

(51) Int. Cl.
*B41J 2/355* (2006.01)

(52) U.S. Cl.
CPC .................................. *B41J 2/3551* (2013.01)

(58) Field of Classification Search
CPC ................................ B41J 2/3551; B41J 2/355
See application file for complete search history.

(56) References Cited

U.S. PATENT DOCUMENTS

| | | | | |
|---|---|---|---|---|
| 6,471,324 | B1 | 10/2002 | Maru | |
| 8,662,616 | B2 | 3/2014 | Steurrys et al. | |
| 10,022,962 | B1 * | 7/2018 | Linn | B41J 2/04541 |
| 2002/0118234 | A1 | 8/2002 | DeMoor et al. | |
| 2004/0109036 | A1 | 6/2004 | Han | |
| 2004/0183843 | A1 | 9/2004 | Walmsley et al. | |
| 2006/0082609 | A1 | 4/2006 | Walmsley et al. | |
| 2015/0015627 | A1 | 1/2015 | Cleare | |
| 2017/0315761 | A1 | 11/2017 | Poole et al. | |

OTHER PUBLICATIONS

PCT/US2024/051227—International Search Report, USPTO ISA/US, Dec. 9, 2024.
PCT/US2024/051227—Written Opinion of the International Searching Authority (ISA), USPTO ISA/US, Dec. 9, 2024.

* cited by examiner

*Primary Examiner* — Justin Seo

(57) ABSTRACT

A method includes: obtaining, at a controller of a device, a delay setting corresponding to an effector head configured to engage with the device, the effector head having (i) an array of effector elements, (ii) a first switch assembly controllable to deliver power to a first subset of the effector elements, and (iii) a second switch assembly configured to deliver power to a second subset of the effector elements; at the controller, activating the array of effector elements by: controlling the first switch assembly to deliver power to the first subset during a first time period, and controlling the second switch assembly to deliver power to the second subset during a second time period, the second time period shifted relative to the first time period according to the delay setting.

8 Claims, 7 Drawing Sheets

MITIGATION OF INDUCTIVE DISCHARGE TRANSIENTS IN PRINTHEADS

BACKGROUND

Printheads in media processing devices such as desktop printers may include or be connected to inductive components. Operation of a printhead may lead to inductive discharge from such components that can damage the printhead.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
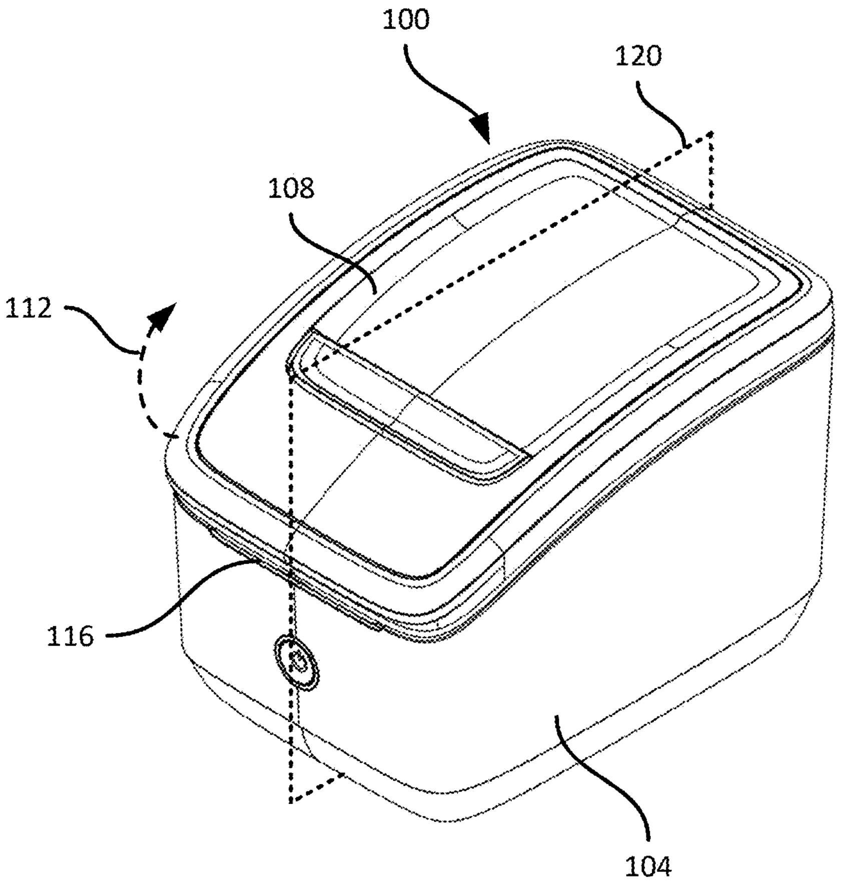
FIG. 1 is a diagram of a printer.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method including: obtaining, at a controller of a device, a delay setting corresponding to an effector head configured to engage with the device, the effector head having (i) an array of effector elements, (ii) a first switch assembly controllable to deliver power to a first subset of the effector elements, and (iii) a second switch assembly configured to deliver power to a second subset of the effector elements; at the controller, activating the array of effector elements by: controlling the first switch assembly to deliver power to the first subset during a first time period, and controlling the second switch assembly to deliver power to the second subset during a second time period, the second time period shifted relative to the first time period according to the delay setting.

Additional examples disclosed herein are directed to a device, comprising: a power supply; an interface configured to engage with an effector head having (i) an array of effector elements, (ii) a first switch assembly controllable to deliver power from the power supply to a first subset of the effector elements, and (iii) a second switch assembly configured to deliver power from the power supply to a second subset of the effector elements; and a controller configured to: obtain a delay setting corresponding to the effector head; and to activate the array of effector elements: control the first switch assembly to deliver power to the first subset during a first time period, and control the second switch assembly to deliver power to the second subset during a second time period, the second time period shifted relative to the first time period according to the delay setting.

FIG. 1 illustrates an example device in the form of a media processing device 100, such as a label printer (also referred to herein as the printer 100). The printer 100 can be implemented as a desktop printer, as illustrated. The printer 100 can also be implemented in a wide variety of other form factors, including a mobile, desktop, industrial form factor, or the like. The printer 100 includes various components configured to apply indicia to media such as discrete labels, a continuous paper strip, identity cards, or the like. The indicia can be applied, for example, by direct thermal printing, thermal transfer printing, or the like. In other examples, the media processing device 100 can include a radio frequency identification (RFID) assembly configured to write data to RFID tags embedded in labels or other media, in addition to or instead of applying indicia to the media.

The printer 100 includes a body 104 housing a media supply, an effector head such as a printhead, and other components, as well as a cover or door 108 configured to open (e.g., in a direction 112) to provide access to an interior of the printer 100. The printer 100 further includes an outlet 116, from which processed media (e.g., labels with indicia having been applied thereto within the body 104 of the printer 100) is dispensed.

Figure 2:
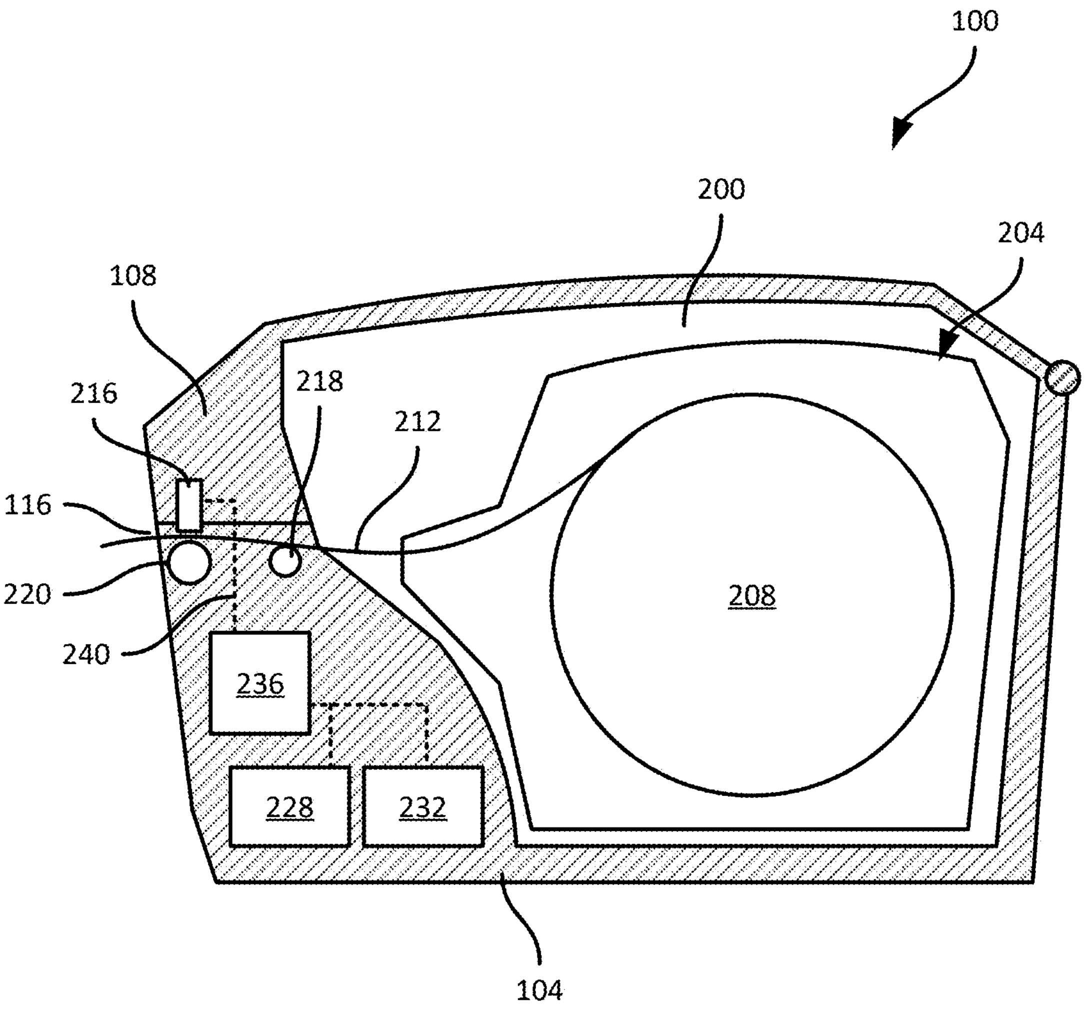
FIG. 2 is simplified cross section of the printer of FIG. 1, illustrating certain internal components of the printer.

FIG. 2 illustrates a simplified cross sectional view of the printer 100, taken at the plane 120 shown in FIG. 1. As seen in FIG. 2, the body 104 and the cover 108 define a chamber 200 for receiving one or more media supplies, such as a media cartridge 204 (also referred to herein as a supply 204) containing a roll 208 of paper, labels, or the like. In other examples, the media supplies accommodated in the chamber 200 can include boxes of fan-feed labels, identity cards, or the like. In still other examples, the printer 100 can include an inlet in the body 104 for receiving media from an external supply, e.g., to travel through the chamber 200 for processing.

Media 212 from the supply 204 (e.g., from the roll 208, in the illustrated example) travels along a media path from the supply 204 to a nip formed by a printhead 216 and a platen roller 220. The media path can be defined by surfaces, rollers, and the like, such as a guide roller 218 (e.g., a passive, or non-driven, roller). The platen roller 220 can be driven, e.g., to pull the media 212 along the media path and through the nip, where the printhead 216 applies indicia to the media 212. The processed media (e.g., bearing indicia applied by the printhead 216) is then dispensed at the outlet 116.

The indicia applied to the media 212 by the printhead 216 can be provided to the printhead 216 by a controller 228 contained within the body 104 of the printer 100. The controller 228 can be implemented, for example, as a field programmable gate array (FPGA) implementing firmware logic, or another suitable controller executing stored computer-readable instructions implementing firmware logic, such as a processor or other logic circuit. Such instructions, and/or configuration data used during the execution of such instructions, can be stored in the controller 228 and/or in a non-transitory computer-readable medium such as a memory 232 connected with the controller 228.

The controller 228 can, for example, receive print data defining text, images, or the like to be applied to the media 212 from a host computing device (e.g., a desktop computer, a smartphone, server, or the like) via a communications interface connected with the controller 228 and supported within the body 104. The controller 228 can be configured, in response to receiving the print data, e.g., in the form of a print command from the above-mentioned host computing device, to control the printhead 216 to apply indicia corresponding to the print data to the media 212.

The printhead 216, includes an array of effector elements, such as discrete thermal elements (e.g., resistive elements) also referred to as dots. The array, for example, can be a linear array (e.g., a line of dots, one dot wide) extending across the media path along which the media 212 travels. The effector elements can be individually activated to apply heat to corresponding portions of the media 212. As will be understood, for direct thermal printers, as shown in FIG. 2, application of heat to a portion of the media 212 may activate a thermochromic pigment in the media 212. For thermal transfer printers, a ribbon can traverse the nip with the media 212, and application of heat to a portion of the media 212 and the ribbon can cause the transfer of pigment from the ribbon to the media 212.

To control the printhead 216 to apply indicia to the media 212, the controller 228 can transmit a sequence of commands to the printhead 216, each defining one line of activation states for the dots of the printhead 216. The activation states can be binary states, indicating whether each dot is to be activated (e.g., energized to produce heat which can be used to print to the media 212 in a corresponding region such that the corresponding regions has a pigment) or to remain inactive (e.g., de-energized such that no heat is produced and a corresponding region of the media 212 remains unpigmented).

As discussed in greater detail below, in response to transmitting a command to the printhead 216 defining a line of activation states, the controller 228 can be configured to supply power to the effector elements of the printhead 216, e.g., from a power supply 236 of the printer 100. The power supply 236 can include suitable circuitry for supplying electrical power to components of the printer 100 from a source such as a battery, an external electrical outlet, or the like. The power supply 236 can include, in some examples, a power conduit 240 such as a cable or the like, for connection to the printhead 216.

Figure 3:
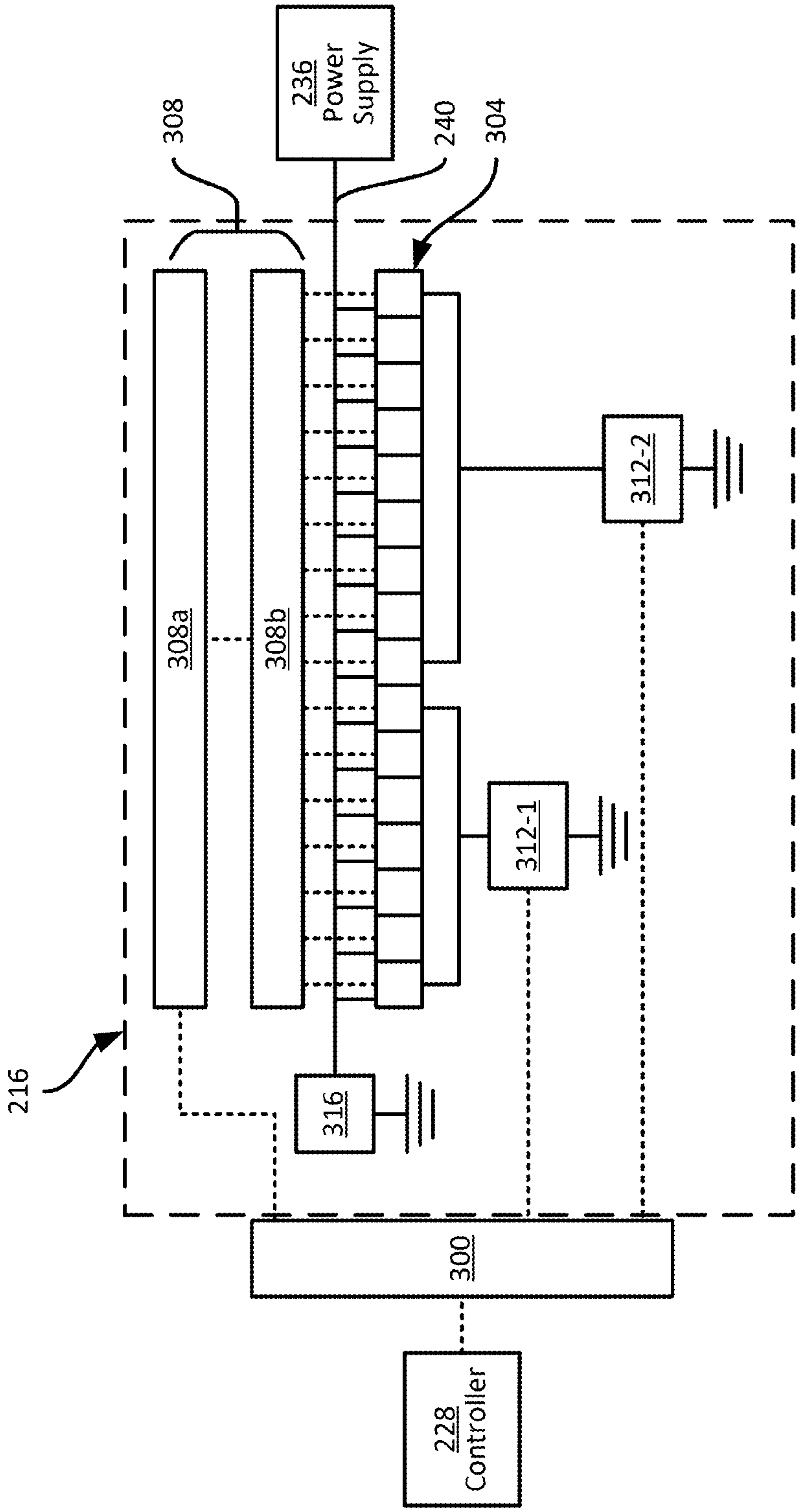
FIG. 3 is a diagram of a printhead of the printer of FIG. 1.

Referring to FIG. 3, a schematic diagram of an example printhead 216 that may be installed in the printer 100 is shown. The controller 228, power supply 236 and conduit 240 are also shown, along with an interface 300 of the printer 100 configured to connect the controller 228 with the printhead 216. The interface 300 can include a physical connector, e.g., with a plurality of pins or other structures configured to engage with corresponding structures of the printhead 216. The conduit 240 can also connect to the printhead 216 via the interface 300, in some examples.

FIG. 3 illustrates connections used for the exchange of control data in dotted lines, and connections used for power delivery in solid lines. In other examples, control data and power delivery can be carried on the same physical connections. The simplified arrangement shown in FIG. 3 is provided for illustrative purposes only.

The printhead 216 includes an array 304 of effector elements. While in the illustrated example, the printhead 216 includes sixteen elements, other printheads can include arrays having a wide variety of numbers of dots. For example, a printer configured to process four-inch wide labels may accept printheads with arrays of about eight hundred dots (e.g., for a resolution of about two hundred dots per inch across the labels). The number of dots in the array 304 can be selected based on the size (e.g., width) of the media, a desired print quality (e.g., with higher numbers of dots for a given media size generally corresponding to higher quality printing), printhead cost (e.g., with smaller numbers of dots for a given media size generally corresponding to lower printhead cost), and the like.

The printhead 216 includes a data port configured to receive commands from the controller 228, defining activation states for each of the effectors (e.g., dots) in the array 304. Each command can include, for example, a string of bits defining, for each effector element in the array 304, whether that element is to be activated or not. For example, a value of "1" in the command causes activation of a corresponding dot to apply heat to the media 212, while a value of "0" causes the corresponding dot to remain inactive (no heat is applied).

The commands received from the controller 228 can be stored in a buffer or other memory 308. In this example, the memory 308 is implemented as a shift register 308*a*, and a latch register 308*b*. The shift register 308*a* can be configured to receive data serially from the controller 228, and can include one bit of storage for each dot in the array 304. The shift register 308*a* can be controlled to transfer data (e.g., a line of activation states for the array 304) to the latch register 308*b*, which can also include one bit of storage for each dot in the array 304. The stored values in the latch register 308*b* can define the activation states for the dots of the array 304. Various other implementations of the memory 308 can also be employed, however. Commands received from the controller 228, for example, can each include sixteen bits corresponding to the dots of the array 304. The bits of a given command are stored in the memory 308 at positions corresponding to the respective dots of the array 304.

To activate the elements of the array 304 according to the command stored in the memory 308, the printhead 216 includes switch assemblies controllable to supply power to the dots with an active state in the memory 308, from the power supply 236. In the illustrated example, the printhead 216 includes a first switch assembly 312-1 configured to deliver power to a first subset of the effector elements, in particular to seven of the sixteen dots of the array 304. The printhead 216 also includes a second switch assembly 312-2 configured to deliver power to a second subset of the effector elements, in particular the remaining nine dots of the array 304. The subsets of dots that each switch assembly 312 can deliver power to are exclusive (that is, no dots are powered by both switch assemblies 312), and each subset represents about one half of the size of the array 304 (although not necessary exactly half). In other examples, the printhead 216 can include more than two switch assemblies 312. The respective portions of the elements of the array 304 that are activated by each switch assembly 312 are substantially equal. For example, in the illustrated embodiment each switch assembly 312 can supply power to about half of the array 304. In an example with three switch assemblies, each switch assembly supplies power to about one third of the array 304. Substantially equal portions of the effector elements being supplied by each switch assembly permits more effective mitigation of inductive discharge resulting from the activation of each switch assemblies, in relation to unequal portions.

Although the switch assemblies 312 are shown as distinct hardware elements from the memory 308 in FIG. 3, the switch assemblies 312 and memory 308 can be implemented via shared hardware elements, such as one or more integrated circuits (ICs) implementing the memory 308 and coupled to or integrated with one or more semiconductor devices implementing the switch assemblies 312 (e.g., one or more metal-oxide-semiconductor field-effector transistors, or MOSFETs). Additionally, while the switch assemblies 312 are illustrated as being disposed between the dots and ground, the switch assemblies 312 can be disposed between the power supply 236 and their respective dots of the array 304.

The controller 228, in addition to providing command data to the printhead 216 for storage in the memory 308, sends control signals, which may also be referred to as strobe signals, to each of the switch assemblies 312. For example, to apply one line of indicia to the media 212, the controller 228 can send command data to the memory 308, and then enable the switch assemblies 312-1 and 312-2 to enable current flow from the power conduit 240 through the array 304 according to the activity states defined in the memory 308. When the switch assemblies 312 have been enabled for a predetermined time period sufficient to heat the dots of the array 304 with active states in the memory 308, thus applying heat to the media 212, the controller 228 can disable the switch assemblies 312-1 and 312-2, and clear the memory 308 for the next line of command data. The above process (load command data to set activity states, fire strobes to heat corresponding elements, disable strobes, clear command data) can be repeated as necessary to apply successive lines of markings to the media 212 as the media 212 traverses the printhead 216.

Certain components of the printer 100 and/or the printhead 216, such as the power conduit 240, may act as inductors during operation of the printer 100. As will be apparent to those skilled in the art, the degree to which the power conduit 240, and/or other cables in the device 100, exhibit inductance may depend on cable length, twist configuration, wire counts within the cables, and the like. For example, the power conduit 240 may have an inductance between about 100 nH and 500 nH (although a wide variety of other power conduit inductances may also apply, depending on the construction of the printhead 216 and printer 100). As a result, enabling the switch assemblies 312-1 and 312-2 can result in magnetic energy being stored in the power conduit 240, and disabling the switch assemblies 312-1 and 312-2 can result in the stored energy being discharged from the conduit 240 into the printhead 216. Such inductive discharge can lead to transient voltages applied to the array 304 and/or switch assemblies 312 that may be sufficient to damage those components, and can also lead to current excursions at various components of the printhead 216, placing thermal stress on those components (e.g., the dots in the array 304 and the switch assemblies 312).

For example, in a printhead 216 with a 24 V supply from the conduit 240, voltage transients resulting from inductive discharge may exceed +/−10 V. Current supplied to the array 304 for command data setting a significant majority of the array 304 to the active state (e.g., all the dots of the array 304 active, to apply a pigmented line extending fully across the media 212) may be about 45 A during strobe firing, and current excursions resulting from inductive discharge may exceed an additional 40 A. As will be apparent to those skilled in the art, the above values are provided for illustrative purposes alone, and a wide variety of voltage transients and current excursions may be observed for various printhead structures. The above voltage transients and/or current excursions may shorten the lifespan of the printhead 216 and/or result in malfunctions.

The printhead 216 can, to mitigate the potential impacts of inductive discharge from the conduit 240, include one or more capacitors 316 configured to store the energy resulting from inductive discharge. The provision of sufficient capacitance to mitigate damage to the array 304 and/or the switch assemblies 312, however, may increase the cost and complexity of the printhead 216.

The controller 228 therefore implements certain additional functions to mitigate transients caused by inductive discharge. As discussed in greater detail below, the controller 228 is configured to enable and disable the switch assemblies 312-1 and 312-2 at different times, rather than simultaneously. The delay between enabling and disabling of the switch assemblies 312-1 and 312-2 is selected to mitigate transients resulting from inductive discharge via destructive interference of the transient signals. In devices implementing the functionality discussed below, capacitance provided at the printhead 216 to absorb inductive discharge may be reduced. The size of the capacitor 316, for example, may be reduced relative to a device that does not implement the mitigating functionality discussed herein.

Figure 4:
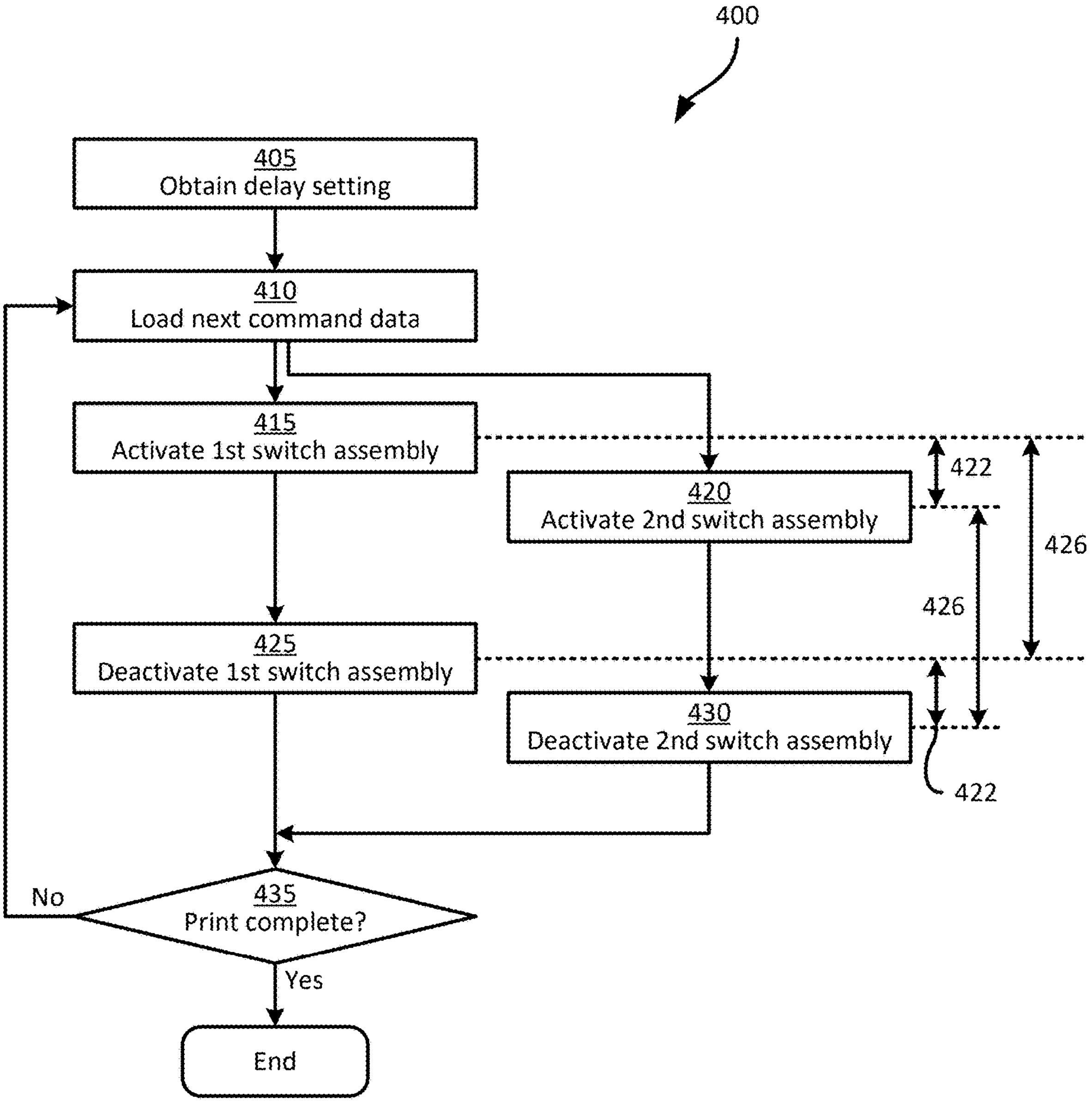
FIG. 4 is a flowchart of a method of mitigating inductive discharge transients.

Turning to FIG. 4, a method 400 of mitigating transients resulting from inductive discharge is illustrated. The method 400 is described below in conjunction with its example performance by the controller 228. It will be understood that the method 400 can also be performed in a variety of other printers 100, as well as other devices with effector assemblies (e.g., other arrays of thermal elements).

At block 405, the controller 228 is configured to obtain a delay setting corresponding to the printhead 216, or other suitable effector head. The delay setting defines a time period to be used by the controller to separate activation of the switch assembly 312-1 and activation of the switch assembly 312-2. The length of the time period defined by the delay setting is selected to generate destructive interference between the transients resulting from inductive discharge from the power conduit 240 in response to each switch assembly 312 being disabled. That is, the delay setting shifts the time period during which the switch assembly 312-1 delivers power relative to the time period during which the switch assembly 312-2 delivers power, such that transients resulting from inductive discharge when the switch assembly 312-1 is disabled destructively interfere with the transients resulting from inductive discharge associated with the switch assembly 312-2 being disabled.

Transients resulting from inductive discharge may have a resonant frequency, resulting from a collapsing magnetic field at the power conduit 240 driving current to the capacitor 316. A voltage at the capacitor 316 may therefore rise above a supply voltage on the power bus connecting the conduit 240 and the capacitor 316. The capacitor 316 may therefore drive current back into the conduit 240. This cycle may repeat at the resonant frequency until the capacitor 316 and/or other components in the printhead 216 have dissipated the energy resulting from inductive discharge. The resonant frequency can be approximated by modelling the printhead 216 and conduit 240 as a resonant circuit (an LC circuit). The frequency of the transients when a single switch assembly 312 is disabled (or when both switch assemblies are disabled simultaneously) can be therefore approximated via Equation 1, below.

$$f_0 = \frac{1}{2\pi\sqrt{LC}} \quad \text{Equation 1}$$

In Equation 1, $f_0$ is the resonant frequency, L is the inductance of the power conduit 240, and C is the estimated total capacitance of the printhead 216 (e.g., the capacitance of the capacitor 316, and estimated capacitance for other components with parasitic capacitance, such as MOSFETs coupled to the integrated circuits implementing the memory 308 and switch assemblies 312. For example, the resonant frequency for a power conduit with an inductance of 300 nH and a 1.4 µF capacitor is about 245 KHz. To obtain destructive interference between transients associated with each switch assembly 312 being disabled, the transients associated with each switch assembly 312 may be shifted by about half of the reciprocal of the above frequency, or about 2 µs (or 180 degrees) relative to each other.

Figure 5A:
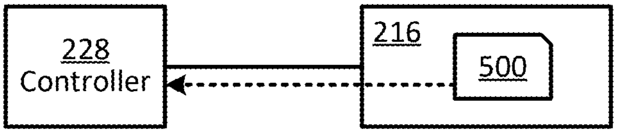
FIG. 5A is a diagram illustrating an example performance of block 405 of the method of FIG. 4.

The delay setting can be obtained at block 405 by various mechanisms. For example, turning to FIG. 5A, the printhead 216 can store a delay setting 500 in a memory such as an electrically erasable programmable read-only memory (EEPROM) or other suitable non-volatile memory. The controller 228 can therefore retrieve, e.g., when the printer 100 is powered on, the delay setting 500 from the printhead 216.

Figure 5B:
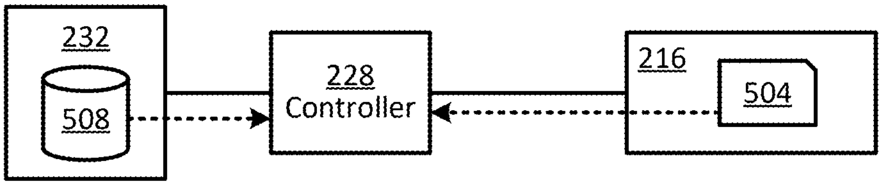
FIG. 5B is a diagram illustrating another example performance of block 405 of the method of FIG. 4

In other examples, as shown in FIG. 5B, the printhead 216 can store, for example in a memory as noted above, a printhead identifier 504 such as a model number, or the like. The controller 228 can be configured, when the printer 100 is powered on, to retrieve the identifier 504, and to look up configuration data from a repository 508 in the memory 232. The repository 508 can include configuration data including delay settings for each of a plurality of printheads that are compatible with the printer 100.

Figure 5C:
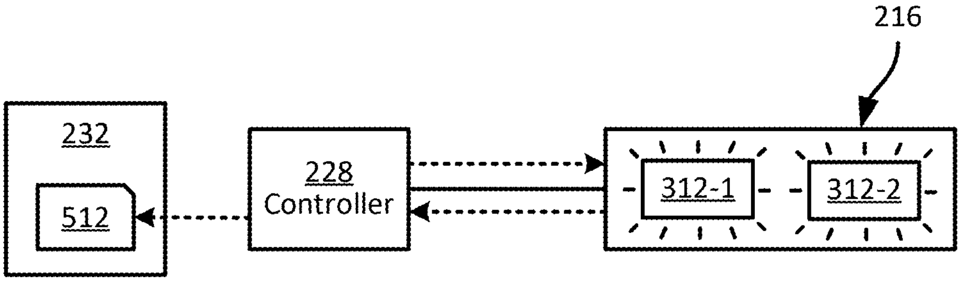
FIG. 5C is a diagram illustrating a further example performance of block 405 of the method of FIG. 4.

In further examples, as shown in FIG. 5C, the controller 228 can be configured to dynamically determine the delay setting. For example, the controller 228 can be configured, e.g., when the printer 100 is powered on, to test fire either or both of the switch assemblies 312 (simultaneously), and measure the frequency of the "ringing" current resulting from inductive discharge into the printhead 216 when the switch assemblies 312 are disabled. For example, the printhead 216 can include a shunt resistor used to sense the resonant frequency. In other examples, the printhead 216 can include a Hall effect sensor to measure the resonant frequency of the ringing current. In further examples, the controller 228 can be configured to measure the resonant frequency via the interface 300, e.g., which can include connections to implement a Kelvin 4-wire measurement circuit. The controller 228 can then determine the half-period of the sensed resonant frequency of the inductive discharge transients, and determine a delay setting 512 from the resonant frequency as discussed above. The determined delay setting 512 can be stored in the memory 232, e.g., until the printer 100 is powered off.

Returning to FIG. 4, at block 410 the controller 228 is configured to load command data to the memory 308 of the printhead 216. For example, the controller 228 can receive print data (e.g., images, text, or the like) from a host computing device as mentioned earlier, and can convert the print data into lines of command data for provision to the printhead 216. At block 410, therefore, the controller 228 is configured to provide the next line of command data to the printhead 216, e.g., by writing the line of command data to the memory 308.

At block 415, the controller 228 is configured to activate the first switch assembly 312-1. The second switch assembly 312-2 is not activated simultaneously with the first switch assembly 312-1. Instead, the controller 228 is configured to activate the second switch assembly 312-2 at block 420, such that the times at which the switch assemblies 312 are activated (to deliver power to the corresponding elements of the array 304) are shifted relative to one another by the delay setting. The performance of block 420 is separated from the performance of block 415 by a time period 422 defined by the delay setting. The time period 422, for example, can be between about 1 µs and about 10 µs. As will be apparent to those skilled in the art, the time period 422 can vary for different printers.

Following the performance of block 420, both switch assemblies 312 are activated, and the array 304 is therefore supplied with power, such that the dots with active states according to the memory 308 are heated. The controller 228 is further configured, at block 425, to deactivate the switch assembly 312-1 after a predetermined time period 426 has elapsed since block 415 was performed. The time period 426 can vary from printhead to printhead. For example, the time period 426 can be between about 100 µs and about 500 µs (although shorter or longer activation time periods can also be used). The delay period 422, in other words, can be shorter than about 10% of the time period 426, and in some examples is shorter than about 1% of the time period 426.

At block 430, the controller 228 is configured to deactivate the switch assembly 312-2 after the predetermined time period 426 has elapsed since the performance of block 420. The time periods during which the switch assemblies 312 are activated are therefore equal, but are shifted relative to one another by the delay time period 422.

At block 435, the controller 228 is configured to determine whether the current print job is complete. When the determination at block 435 is negative, the controller 228 returns to block 410. When the determination at block 435 is affirmative, the performance of the method 400 ends.

Although the switch assembly 312-1 is activated and deactivated earlier than the switch assembly 312-2 in the above example, in other implementations the switch assembly 312-2 can be activated and deactivated earlier than the switch assembly 312-1. The time periods 426 for which the switch assemblies 312 are actively supplying power to the array 304, while overlapping, are not simultaneous (e.g., the switch assemblies 312 are not activated or deactivated within less than 0.1 µs of each other, which may be considered simultaneous, depending on the clock frequency of the controller 228).

Figure 6:
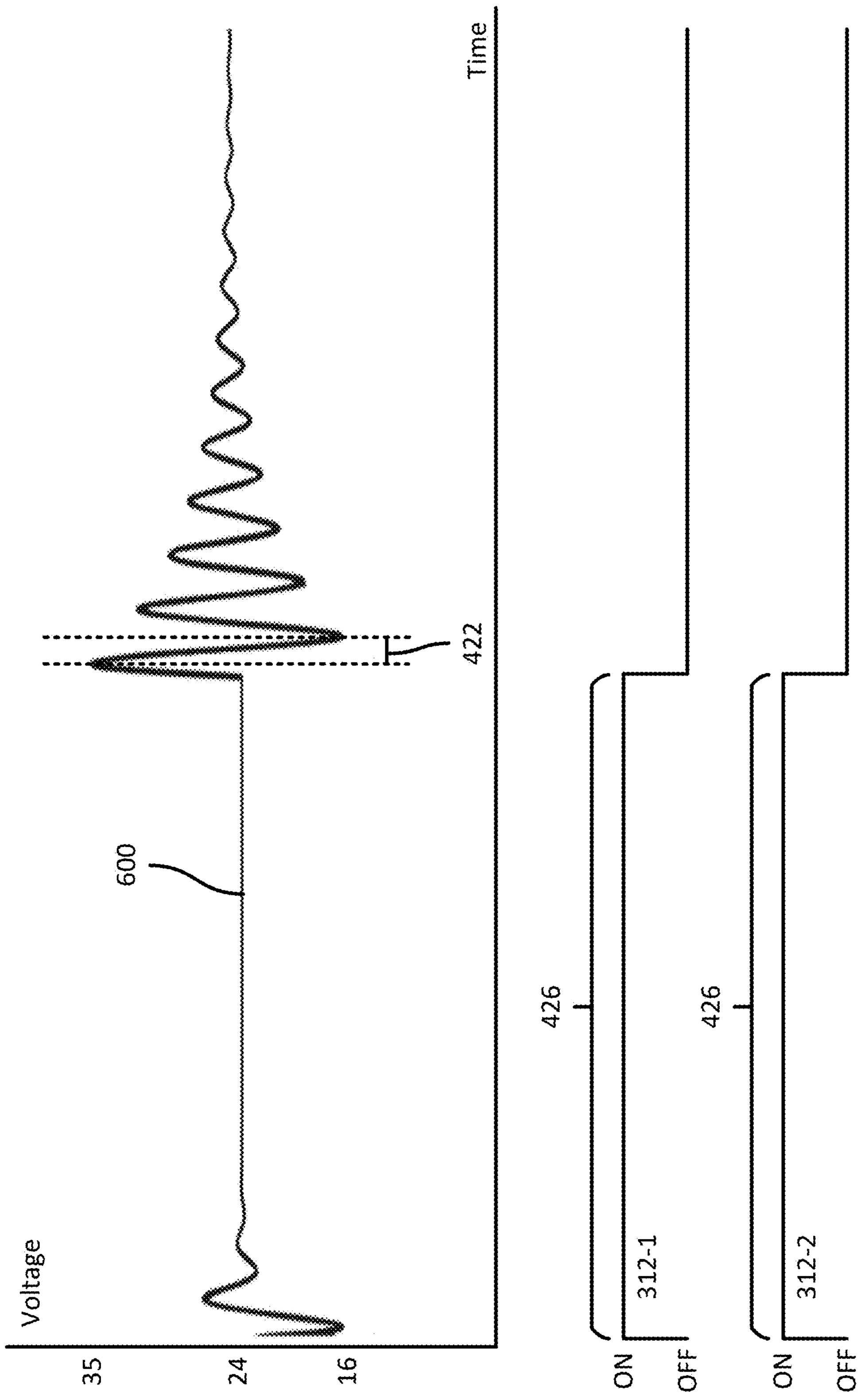
FIG. 6 is a diagram illustrating inductive discharge transients for simultaneously activated printhead switch assemblies.
Figure 7:
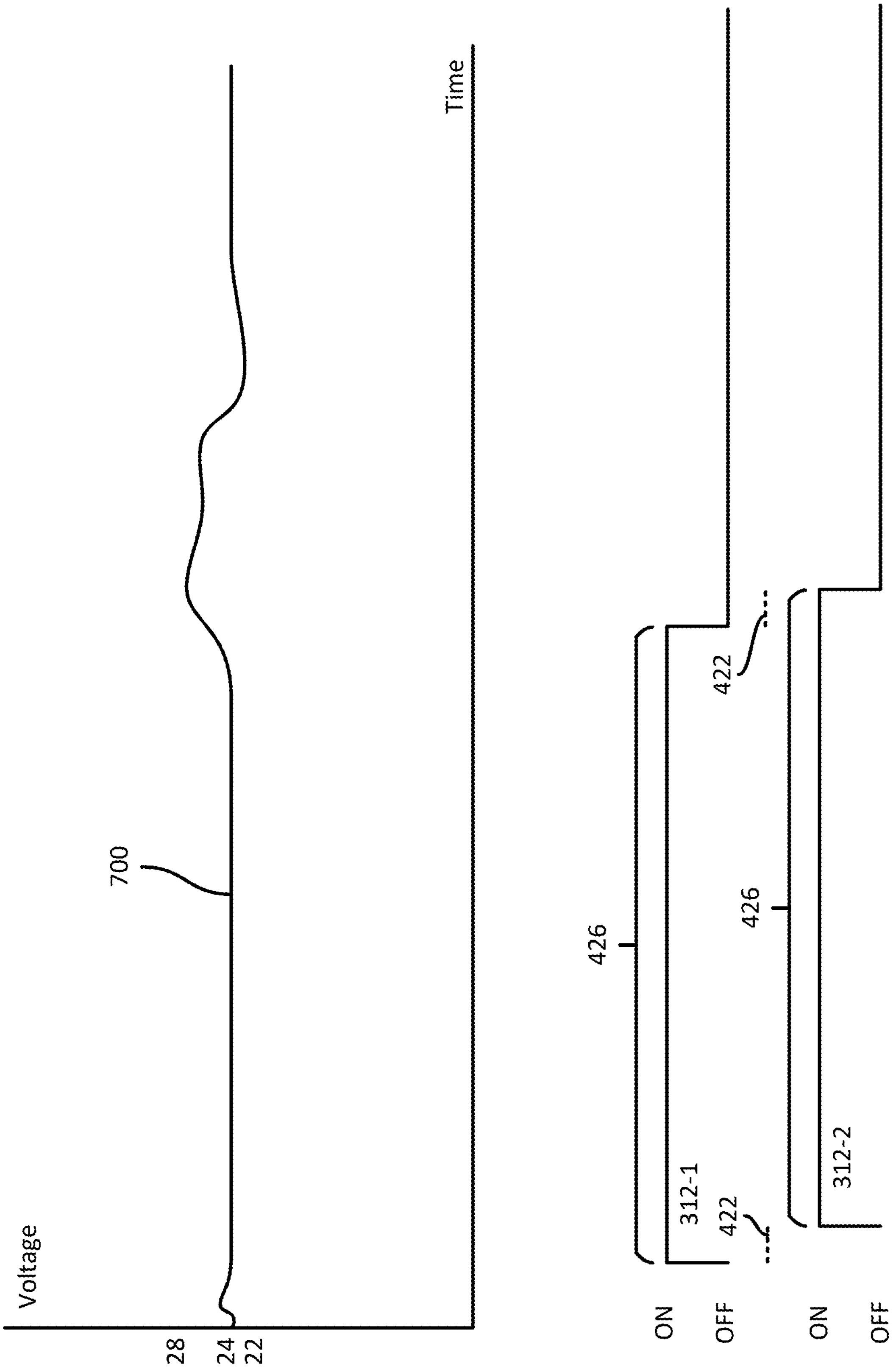
FIG. 7 is a diagram illustrating inductive discharge transients for printhead switch assemblies controlled according to the method of FIG. 4.

FIG. 6 illustrates an example transient signal 600 resulting from inductive discharge when the switch assemblies 312 are fired (e.g., activated and deactivated) simultaneously. As shown in FIG. 6, excursions from the nominal voltage of 24 V at the power conduit 240 may exceed 10 V. As also illustrated in FIG. 6, the time period 422 corresponds to one half period (or 180 degrees) of the transient signal 600. FIG. 7 illustrates an example transient signal 700 resulting from inductive discharge when the switch assemblies 312 are fired for time periods shifted relative to one another by the time period 422. As seen in FIG. 7, destructive interference between the transients generated by deactivation of each switch assembly 312 may result in an attenuated total transient signal, reducing the amount of energy to be dissipated by the capacitor 316 and/or reducing thermal stress on the switch assemblies 312, connectors within the printhead 216, and the like.

In other embodiments, the mitigation of transients resulting from inductive discharge can be implemented in printheads 216 with a single strobe signal. The single strobe signal can control, e.g., the switch assemblies 312. Alternatively, the printhead 216 can have a single switch assembly 312 for each of the dots in the array and the single strobe signal can control the single switch assembly 312. For example, the controller 228 can be configured to pre-process each line of data destined for the printhead 216 into two or more distinct lines. Each line of data can be input to the shift register 308*a*, and then to the latch register 308*b* to set the activation state of each dot. As will be apparent, the latch register 308*b* can store a line of data while the shift register 308*a* receives the next line of data.

The first of the two lines generated by the controller 228, for example, can include the first half of the bits that would be input to the shift register 308*a*, and the remaining half of the bits in the first line can be set to zero (inactive). The second line can include the second half of the bits that would be input to the shift register 308*a*, and no value for the first half. The controller 228 can then be configured to apply the first line to the shift register 308*a*, and then to the latch register 308*b*, before activating the strobe signal. Thus, one half of the dots of the array 304 are activated according to the states set in the original line of data. The controller 228 can then apply the second line to the shift register 308*a*. The second line does not include values for the first half of the original data, and when applied to the latch register 308*b*, will therefore not override the values of the first half in the latch register 308*b*. The controller 228 can be configured to transfer the values of the second line to the latch register 308*b* once the delay period described above has elapsed, while the strobe signal continues to be applied. Thus, once the delay period has elapsed, the full line of original data is applied via the array 304. The delay between activation of the first half of the array 304 and the second half of the array can generate destructive interference between the inductive discharge transients described earlier. The controller 228 can further be configured to reset the first half of the latch register 308*b*, deactivating one half of the array 304, and to reset the second half of the latch register 308*b* after the delay period has elapsed. The functionality of the two or more switch assemblies 312, in other words, can be implemented via a combination of a switch assembly 312 and time-separated control of the shift register 308*a* and latch register 308*b*.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method, comprising:
- obtaining, at a controller of a device, a delay setting corresponding to an effector head configured to engage with the device, the effector head having (i) an array of effector elements, (ii) a first switch assembly controllable to deliver power to a first subset of the effector elements, and (iii) a second switch assembly configured to deliver power to a second subset of the effector elements;
- at the controller, activating the array of effector elements by:
  - controlling the first switch assembly to deliver power to the first subset during a first time period, and
  - controlling the second switch assembly to deliver power to the second subset during a second time period, the second time period shifted relative to the first time period according to the delay setting,
- wherein obtaining the delay setting includes:
  - controlling the first and second switch assemblies to simultaneously deliver power to the first and second subsets of effector elements;
  - measuring a frequency of inductive discharge associated with the power supply; and
  - determining the delay setting based on the frequency.

2. The method of claim 1, wherein the first and second time periods have equal lengths.

3. The method of claim 1, wherein the delay setting defines a shift of less than 10% of the length of the first and second time periods.

4. The method of claim 1, wherein the delay setting is one half of the reciprocal of the frequency.

5. A device, comprising:
- a power supply;
- an interface configured to engage with an effector head having (i) an array of effector elements, (ii) a first switch assembly controllable to deliver power from the power supply to a first subset of the effector elements, and (iii) a second switch assembly configured to deliver power from the power supply to a second subset of the effector elements; and
- a controller configured to:
  - obtain a delay setting corresponding to the effector head; and
  - to activate the array of effector elements:
    - control the first switch assembly to deliver power to the first subset during a first time period, and
    - control the second switch assembly to deliver power to the second subset during a second time period, the second time period shifted relative to the first time period according to the delay setting,
- wherein the controller is configured to obtain the delay setting by:
  - controlling the first and second switch assemblies to simultaneously deliver power to the first and second subsets of effector elements;
  - measuring a frequency of inductive discharge associated with the power supply; and
  - determining the delay setting based on the frequency.

6. The device of claim 5, wherein the first and second time periods have equal lengths.

7. The device of claim 5, wherein the delay setting defines a shift of less than 10% of the length of the first and second time periods.

8. The device of claim 5 wherein the delay setting is one half of the reciprocal of the frequency.

* * * * *